July 24, 1934.  J. A. PERRY  1,967,841

BOLTED PIPE JOINT

Filed July 24, 1933

Inventor

Joseph A. Perry,

By Augustus B. Stoughton,

Attorney

Patented July 24, 1934

1,967,841

UNITED STATES PATENT OFFICE 1,967,841

BOLTED PIPE JOINT

Joseph A. Perry, Swarthmore, Pa., assignor to The United Gas Improvement Company, Philadelphia, Pa., a corporation of Pennsylvania Application July 24, 1933, Serial No. 681,939

5 Claims. (Cl. 285—17)

The present invention relates to bolted pipe joints for underground metal piping.

It has been found from tests under my direction, that in typical bolted metal pipe joints subject to electrolytic corrosion there is a great tendency for the bolts and nuts of the joints to lose a disproportionate quantity of metal as compared with the remainder of the joint. Due to their position and surface exposure a disproportionate quantity of electricity tends to leave the joint from the bolts and nuts. As a result joints fail by corrosion of the bolts and nuts while the remainder of the joint, which can better afford the loss of metal, is in relatively good condition.

The principal object of the present invention is to provide means for preventing or minimizing the loss of metal from the bolts and nuts and thereby prolonging the life of the joint.

The invention will be described in connection with the accompanying drawing which forms a part of this specification and which shows a form of the invention chosen for illustration and in which—

Figure 1:
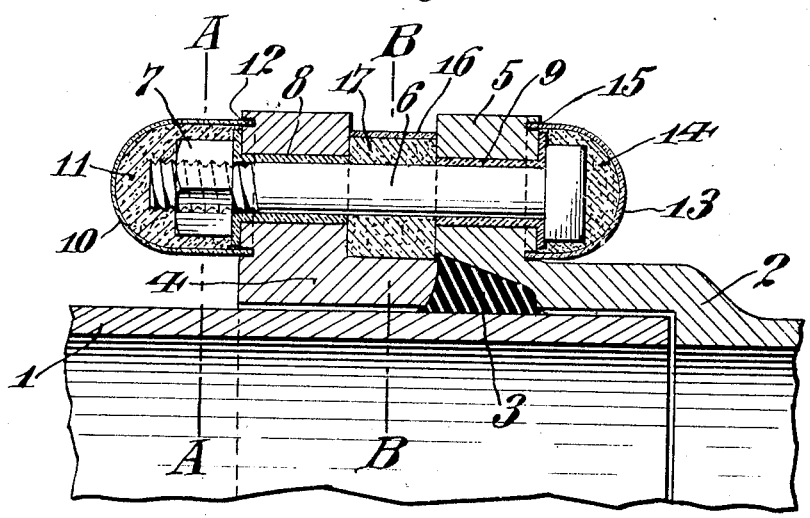
Figure 1 shows chiefly in cross section a portion of a bolted metal bell and spigot pipe joint arranged in accordance with my invention.
Figure 2:
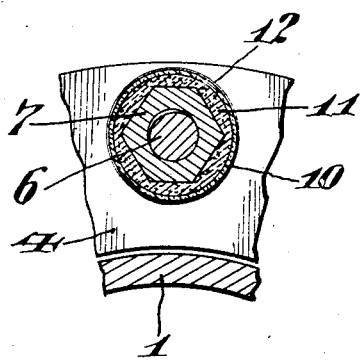
Figure 2 shows a cross section along the line A—A in Figure 1.
Figure 3:
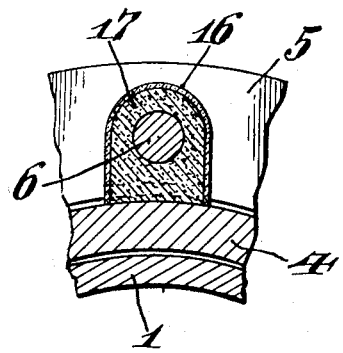
Figure 3 shows a cross section along the line B—B in Figure 1.

Referring to the drawing, 1 indicates the spigot end of the pipe section inserted in the bell end 2 of an adjoining section. 3 is a rubber gasket driven into the joint by the follower ring 4, which is bolted to the flange 5 of the bell by bolts, such as bolt 6, which is drawn up and secured by the nut 7. 8 and 9 are thimbles of electrically insulating material such as fiber arranged to insulate the bolt and nut from the follower ring and flange.

10 is a cup shaped element or caps, adapted to be filled with plaster electrically insulating material (indicated at 11) such as pitch or cement and pushed on over the nut and threaded end of the bolt. It may engage in a slot in the follower ring indicated at 12. 13 is a similar cup filled with plastic insulating material 14 and pressed over the head of the bolt. The slot 15 may be provided in the flange 5 to hold it.

16 is an arched element adapted to contain electrically insulating plastic material 17 and arranged to cover the portion of the bolt extending between the follower ring and the flange.

The elements 10, 13 and 16 may be made of electrically insulating material such as fiber, porcelain, or may be made of thin metal, which may or may not be enameled.

The provision of the electrically insulating thimbles 8 and 9 reduces the tendency for current to flow from the pipe sections to the bolt and the elements 10, 13 and 16 cover the exposed sections of the bolts and with their filling of insulating material prevent current leaving the joint by way of the bolts and nuts.

With the same total current leaving the joint the same quantity of metal will be carried away whether the bolts are protected in accordance with the invention or not. The provision of this protection, however, redistributes the loss on portions of the joint which can better afford it, thereby increasing the life of the joint.

The invention has been described in connection with a bolted bell and spigot joint, it is equally applicable to other forms of bolted joints, for instance sleeve joints of the "Dresser" type and others and may be advantageously used in joints in which the pipe sections are electrically insulated from each other.

It will be obvious to those skilled in the art that modifications may be made in details of construction and arrangement and in matters of mere form without departing from the spirit of the invention which is not limited to such matters, or otherwise than the prior art and the appended claims may require.

I claim:

1. Means for restricting the electrolytic corrosion loss of metal from the bolts and nuts of pipe joints, comprising the combination with the spaced flanges of the bell section of the pipe joint and the follower ring of the joint and the bolts and nuts connecting the same, of caps housing the heads of the bolts and the nuts and engaging slots provided in the outer faces of the flanges, arch shaped elements arranged between the flanges and housing the portions of the bolts extending between the same, and electrically insulating material filling the caps and arch shaped elements and enveloping the nuts, bolt heads and intermediate portions of the bolts.

2. Means for restricting the electrolytic corrosion loss of metal from the bolts and nuts of pipe joints, comprising the combination with the spaced flanges of the bell section of the pipe joint and the follower ring of the joint and the bolts and nuts connecting the same, of caps housing the heads of the bolts and the nuts, arch shaped elements arranged between the flanges and housing the portions of the bolts extending between the same, and electrically insulating material filling the caps and arch shaped elements and enveloping the nuts, bolt heads and intermediate portions of the bolts.

3. Means for restricting the electrolytic corrosion loss of metal from the bolts and nuts of pipe joints, comprising the combination with the spaced flanges of the bell section of the pipe joint and the follower ring of the joint and the bolts and nuts connecting the same, thimbles of insulating material arranged through the flanges and surrounding the portions of the bolts there located, of caps housing the heads of the bolts and the nuts, arch shaped elements arranged between the flanges and housing the portions of the bolts extending between the same, and electrically insulating material filling the caps and arch shaped elements and enveloping the nuts, bolt heads and intermediate portions of the bolts.

4. Means for restricting the electrolytic corrosion loss of metal from the bolts and nuts of pipe joints provided with spaced flanges and bolts and nuts connecting them, comprising the combinations with said flanges, bolts and nuts of caps housing the heads of the bolts and nuts and electrically insulating material filling the caps and enveloping the bolt heads and nuts.

5. Means for restricting the electrolytic corrosion loss of metal from the bolts and nuts of pipe joints comprising the combination with an otherwise exposed end of a bolt element of a cap adapted to be pushed on over said end and housing and protecting it from electrolytic loss of metal.

JOSEPH A. PERRY.